US012711029B2

(12) United States Patent
Zhivich et al.

(10) Patent No.: US 12,711,029 B2
(45) Date of Patent: Aug. 18, 2026

(54) MULTI-HOST ENVIRONMENT RESILIENCY

(71) Applicant: Dell Products L.P., Round Rock, TX (US)

(72) Inventors: Julie Zhivich, Westborough, MA (US); Jitender Sawal, Newton, MA (US); Qin Wang, Northborough, MA (US); Jonathan Krasner, Coventry, RI (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/643,022

(22) Filed: Apr. 23, 2024

(65) Prior Publication Data

US 2025/0328435 A1 Oct. 23, 2025

(51) Int. Cl.
*G06F 11/20* (2006.01)

(52) U.S. Cl.
CPC ...... *G06F 11/2025* (2013.01); *G06F 11/2002* (2013.01); *G06F 11/2005* (2013.01); *G06F 11/2007* (2013.01); *G06F 2201/805* (2013.01)

(58) Field of Classification Search
CPC ............. G06F 11/2025; G06F 11/2002; G06F 11/2005; G06F 11/2007; G06F 2201/805
See application file for complete search history.

(56) References Cited

U.S. PATENT DOCUMENTS 10,229,017 B1 * 3/2019 Zou .................... G06F 11/2007
10,983,879 B1 * 4/2021 Agrawal ............. G06F 13/1668
12,124,343 B1 * 10/2024 Goel .................. G06F 11/2005
2009/0319836 A1 * 12/2009 Khatri ................ G06F 11/2005 714/57
2014/0237156 A1 * 8/2014 Regula ................ G06F 13/4022 710/314
2015/0033222 A1 * 1/2015 Hussain ................ H04L 49/70 718/1
2017/0147456 A1 * 5/2017 Lee .................... G06F 11/2033
2017/0155573 A1 * 6/2017 Khemani ................ H04L 45/28
2017/0329735 A1 * 11/2017 Garg .................. G06F 13/4282
2019/0356535 A1 * 11/2019 Li ...................... H04L 41/0631
2020/0050523 A1 * 2/2020 Pawlowski ......... G06F 11/2028
2022/0350767 A1 * 11/2022 McGraw ............. G06F 11/2007
2023/0120453 A1 * 4/2023 Rao .......................... H02H 3/08 340/4.3
2023/0300623 A1 * 9/2023 Barnes ................. H04W 12/72 455/411

* cited by examiner

*Primary Examiner* — Marc Duncan
*Assistant Examiner* — Michael Xu
(74) *Attorney, Agent, or Firm* — Krishnendu Gupta; Nikhil Patel

(57) ABSTRACT

One or more aspects of the present disclosure relate to achieving resiliency and high availability in a multi-host environment. In embodiments, a plurality of Peripheral Component Interconnect Express (PCIe) links and network interface cards (NICs) controlled by a plurality of hosts in a multi-host environment is monitored. In addition, a fault condition is detected. For example, the fault condition includes at least an unexpected NIC reset, a PCIe link fault, or a server power cycle event. Further, traffic transmission over a network is controlled based on the fault condition.

20 Claims, 5 Drawing Sheets

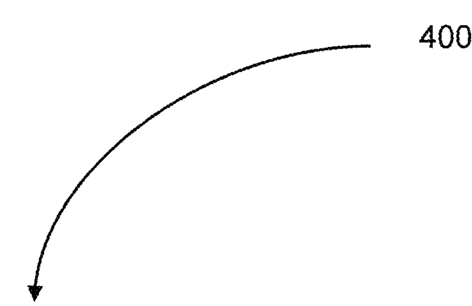

402 monitoring a plurality of Peripheral Component Interconnect Express (PCIe) links and network interface cards (NICs) controlled by a plurality of hosts in a multi-host environment 404 detecting a fault condition, wherein the fault condition includes at least an unexpected NIC reset, a PCIe link fault, or a server power cycle event 406 controlling traffic transmission over a network based on the fault condition type

FIG. 4

502 broadcasting a message regarding a fault condition in a first server of a multi-host environment to network devices 504 initiating a traffic cleanup process in response to the broadcasted message 506 identifying a type of the fault condition 508 adjusting data traffic routing to isolate the fault and maintain system service

MULTI-HOST ENVIRONMENT RESILIENCY

BACKGROUND

A multi-host environment refers to a network or computing setup where multiple host systems, also known as root complexes in specific contexts like Peripheral Component Interconnect Express (PCIe) architectures, share and access common resources. These resources can include Network Interface Controllers (NICs), storage devices, memory, and other peripherals or services. A "host" can include a computer or server equipped with a processor and operating system capable of running applications and managing hardware resources.

SUMMARY

One or more aspects of the present disclosure relate to achieving resiliency and high availability in a multi-host environment. In embodiments, a plurality of Peripheral Component Interconnect Express (PCIe) links and network interface cards (NICs) controlled by a plurality of hosts in a multi-host environment is monitored. In addition, a fault condition is detected. For example, the fault condition includes at least an unexpected NIC reset, a PCIe link fault, or a server power cycle event. Further, traffic transmission over a network is controlled based on the fault condition.

In embodiments, a fault notification can be transmitted to a subject host of the plurality of hosts affected by the fault condition.

In embodiments, a traffic path failover process can be initiated in response to the fault notification.

In embodiments, data traffic paths corresponding to the fault condition can be disabled.

In embodiments, network operations can be continued over data traffic paths alternate to those data traffic paths corresponding to the fault condition.

In embodiments, one or more endpoints on the network and in the multi-host environment can be notified of the fault condition.

In embodiments, an out-of-band control messaging interface can be used to notify and send control messages to a subject host of the plurality of hosts affected by the fault condition.

In embodiments, a hardware interrupt indicative of the fault condition can be transmitted to a subject host of the plurality of hosts affected by the fault condition.

In embodiments, whether the hardware interrupt signals a NIC reset or a PCIe link fault can be determined by the subject host. Additionally, a rapid cleanup of in-flight traffic through each PCIe link and each NIC corresponding to the fault condition can be executed by the subject host. Further, data traffic paths through each PCIe link and each NIC corresponding to the fault condition can be disabled by the subject host.

In embodiments, network operations through an operational NIC or PCIe link can be maintained by the subject host.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 4 is a flow diagram of a method for achieving resiliency and high availability in a multi-host environment per embodiments of the present disclosure.

DETAILED DESCRIPTION

Figure 1:
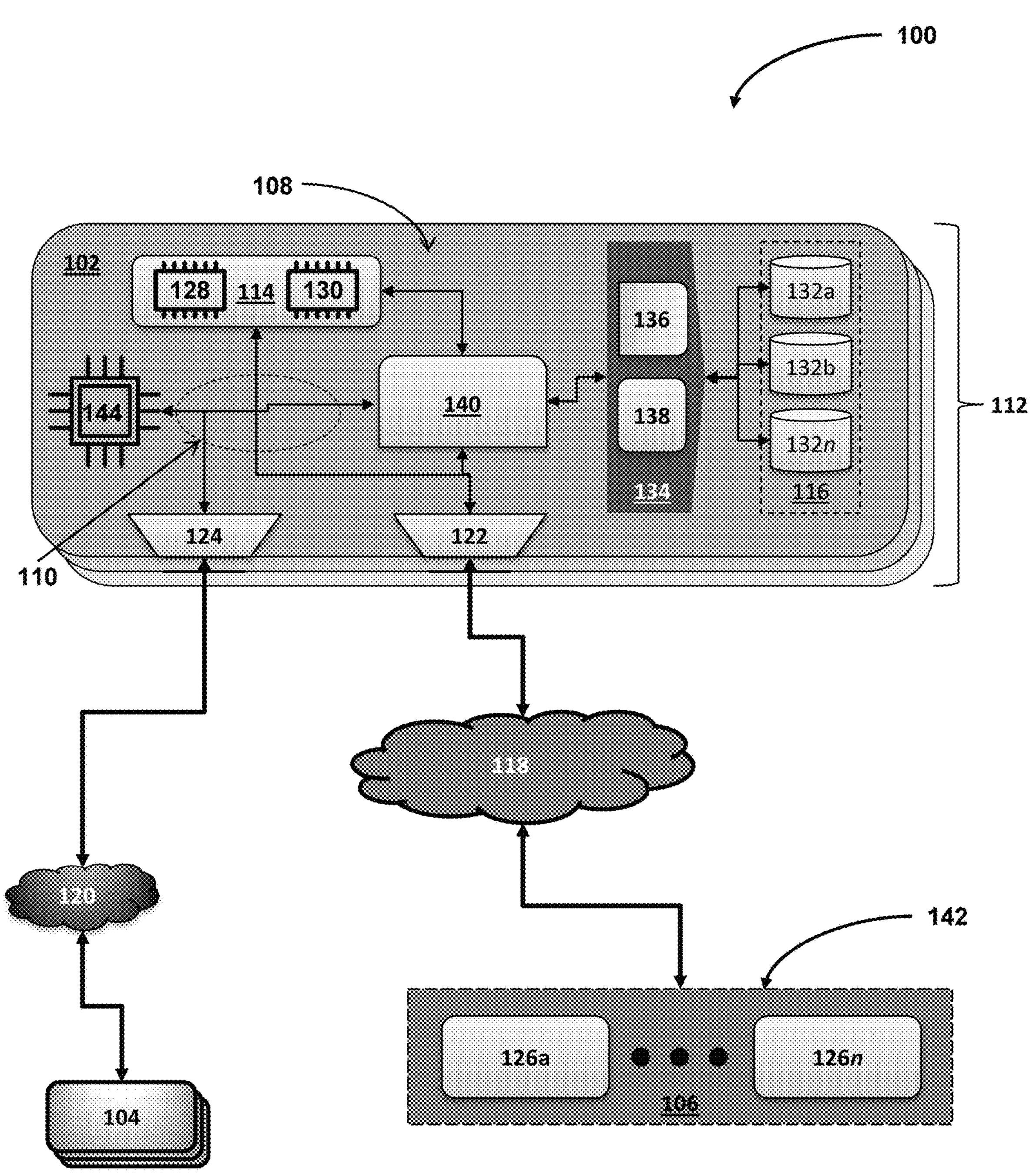
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Occasionally, a business can provide employees and customers with access to different services and applications via a multi-server (e.g., multi-host) environment. A multi-server environment is a server infrastructure that uses multiple servers to provide users access to various services and applications. Advantageously, a multi-server environment can offer a higher level of reliability and availability than a single-server environment. For example, if one server in a multi-server environment goes down, the other servers can continue to provide access to certain services and applications users need. In addition, a multi-server environment can offer a higher level of performance than a single-server environment because the load can be distributed across multiple servers.

Traditionally, in computing environments, each host (or server) is paired with its own Network Interface Controller (NIC), which serves as the interface between the host and the rest of the network. This setup is straightforward and works well for many applications, but it has scalability, flexibility, and resource utilization limitations. Specifically, it does not allow for the dynamic sharing of NICs among multiple hosts, leading to underutilization of network resources and increased costs in large-scale deployments.

In response to these limitations, multi-host environments have been developed. In such environments, multiple computational hosts interact with and control a shared set of network resources, including Peripheral Component Interconnect Express (PCIe) links and network interface cards (NICs). This approach can significantly improve resource utilization and flexibility, as NICs can be dynamically allocated to hosts based on current demand. The approach is instrumental in data centers and cloud computing platforms, where workloads can vary dramatically. However, the complexity of managing data traffic across these shared resources is compounded by the need to maintain continuous network service and data integrity in the face of various fault conditions.

Traditional network architectures often struggle with the rapid identification and isolation of faults, particularly in systems where multiple root complexes or hosts control resources such as NICs. Faults such as unexpected NIC resets, PCIe link failures, or server power cycles can lead to significant disruptions in data traffic, resulting in prolonged downtime, data loss, or system instability. The challenge is further exacerbated when considering the need to contain and isolate such faults without affecting the overall multi-host environment.

Existing solutions typically lack the sophistication required to differentiate between types of faults and to respond appropriately. For instance, a system may treat all faults with the same severity level, leading to unnecessary disabling of resources and suboptimal traffic rerouting. Moreover, the time taken to detect and respond to faults often results in a reactive approach that fails to prevent the cascading effects of initial failures, potentially leading to a complete system crash or data unavailability.

Embodiments of the present disclosure include advanced systems and methods for ensuring high availability and resiliency in multi-host network environments. For example, the embodiments can include a control messaging interface that enables rapid fault detection and recovery. The interface operates on an out-of-band signaling channel, ensuring that control messages are transmitted without interference from network traffic disruptions. It employs a specialized protocol optimized for low latency and high reliability, which is crucial for immediate fault notification and coordinated response among multiple hosts.

Further, the embodiments can include a fabric monitoring subsystem for continuously scanning network resources, such as NICs and PCIe links, to detect and differentiate fault conditions. Upon detection, the subsystem triggers a hardware interrupt, prompting a path management subsystem to isolate the fault and disable affected data traffic paths. Concurrently, the control messaging interface broadcasts detailed fault information to all endpoints, enabling them to execute rapid failover and rerouting procedures.

A sophisticated path selection algorithm is employed, considering bandwidth, latency, and error rate criteria, with optimization objectives focused on minimizing disruption and maximizing resource utilization. The system's coordinated approach to fault management ensures seamless network operations, maintaining data integrity and service continuity in the face of unexpected faults.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the hosts 106 can have a multi-server (e.g., multi-host) architecture. Specifically, each client machine 126*a-n* can be a physical server (e.g., a server blade in a server rack). For example, the multi-host architecture (or environment) can define a network or computing setup where multiple host systems, also known as root complexes in certain contexts like PCI Express (PCIe) architectures, share and access common resources. These resources can include Network Interface Controllers (NICs), storage devices, memory, and other peripherals or services. A "host" can include a computer or server equipped with a processor and operating system capable of running applications and managing hardware resources.

In embodiments, a multi-host environment 142 includes multiple hosts (e.g., root complexes) sharing multiple NICs. Each NIC is designated a primary host and a secondary host, and similarly, each host is assigned a primary NIC and a secondary NIC. This setup enhances resource utilization, increases redundancy, and improves system performance and flexibility. However, it also introduces complexity in managing the shared resources, especially in handling the dynamic nature of the environment, such as when unexpected NIC resets, PCIe link failures, or server power cycles occur.

As described in greater detail herein, embodiments of the present disclosure introduce a novel approach to fault management that leverages a control messaging interface, a fabric monitoring subsystem, a path management subsystem, and the like to ensure continuous network operations in the face of faults.

For example, the fabric monitoring system can continuously scan a network, detecting faults such as unexpected NIC resets, PCIe link faults, or server power cycle events. Upon fault detection, the subsystem can differentiate between the types of faults using advanced diagnostic algorithms and detection methodologies, including signature analysis, anomaly detection, and threshold-based detection.

In embodiments, the control messaging interface operates on an out-of-band channel, ensuring that fault notifications are transmitted promptly and reliably to affected hosts. This rapid communication enables hosts to initiate a traffic path failover process, rerouting network operations over alternate data traffic paths unaffected by the fault condition.

Further, the path management subsystem can employ a sophisticated path selection logic and circuitry that considers various criteria such as bandwidth, latency, error rates, and quality of service requirements. For instance, the path management subsystem can optimize traffic for minimal disruption and efficient resource utilization, enabling the network to maintain high performance and data integrity during a failover process.

Figure 2:
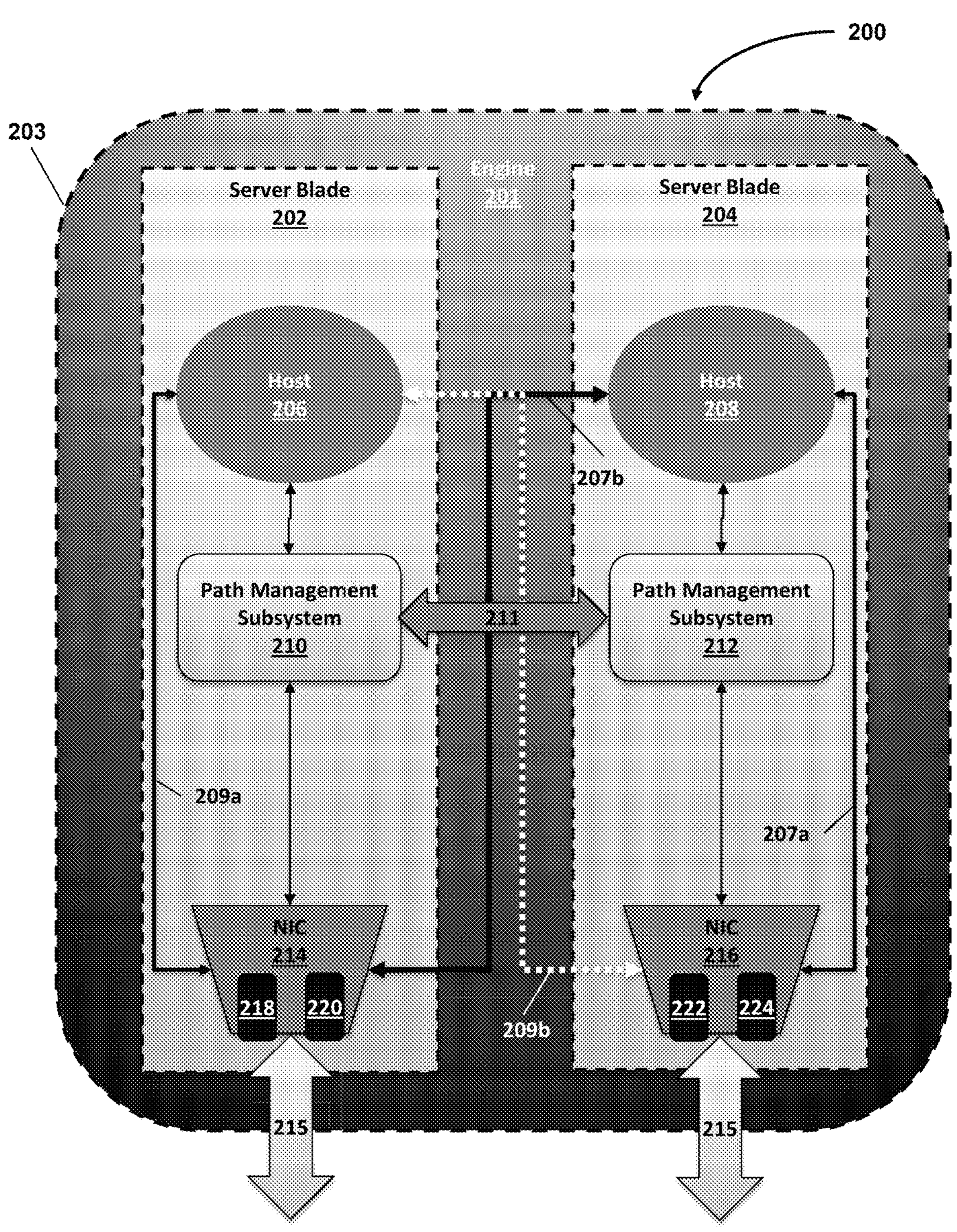
FIG. 2 is a block diagram of a server system in accordance with embodiments of the present disclosure.

Regarding FIG. 2, a server system 200 can include an engine 201 housed in a shelf (e.g., housing) 203 that interfaces with a cabinet or server rack (not shown). The engine 201 can include hardware and circuitry configured to provide host services via, e.g., one or more server blades (e.g., boards). For example, the engine 201 can include a pair of server blades 202/204 with hardware, circuitry, and logic configured to host applications and services used by employees or customers of a business or organization. The server system 200 can also include a multi-host environment architecture where multiple hosts 206/208, also known as root complexes in contexts like PCI Express (PCIe) architectures, share and access common resources. The resources can include PCIe links, Network Interface Controllers (NICs), storage devices, memory, and other peripherals or services.

In embodiments, a first server blade 202 can include a first host 206, and a second server blade 204 can include a second host 208. In addition, each server blade 202/204 can include a network interface controller (NIC) 214/216 configured to enable communications with devices on a network (e.g., the SAN 118 of FIG. 1). For example, the first and second hosts 206/208 can include respective processors and operating systems that run applications and services for employees/customers of a business or organization. Accordingly, each NIC 214/216 includes hardware/circuitry configured to enable the hosts 206/208 to communicate with a physical layer and a data link layer standard such as Ethernet for Wi-Fi corresponding to the network.

In embodiments, the multi-host environment architecture of the server system 200 involves multiple hosts (e.g., the hosts 206/208) sharing multiple NICs (e.g., the NICs 214/216). Specifically, each NIC is designated a primary host and a secondary host, and similarly, each host is assigned a primary NIC and a secondary NIC. For example, the first host 206 can use a first NIC 214 as its primary NIC and a second NIC 216 as its secondary NIC. Further, the first host 206 can be communicatively coupled to the first NIC 214 via a primary PCIe link 209*a*. The first host 206 can also be communicatively coupled to the second NIC 216 via a secondary PCIe link 209*b*. The second host 208 can also use the first NIC 214 as its secondary NIC and the second NIC as its primary NIC. Accordingly, the second host 208 can be communicatively coupled to the first NIC 214 via a secondary PCIe link 207*b* and communicatively coupled to the second NIC 216 via a primary PCIe link 207*a*.

In embodiments, the server system 200 can establish in-band communications channels 215 with devices (e.g., the storage array 102 of FIG. 1) on a network (e.g., the SAN 118 of FIG. 1). Accordingly, the in-band communication channels 215 can correspond to primary data channels used by the hosts 206/208 for controlling or managing data over the network. For example, the hosts 206/208 can run applications that read/write data on a storage array connected to the network.

In embodiments, the hosts 206/208 can include respective path management subsystems 210/212 that include hardware, circuitry, and logic configured to dynamically manage paths through which data travels between the hosts 206/208 and the NICs 214/216. For example, the path management subsystems 210/212 can configure and synchronize virtual ports (Vports) 218/220/222/224 corresponding to physical NICs 214/206 ports. Specifically, the path management subsystems can establish the Vports 218/220/222/224 as logical constructs that allow for the separation and management of traffic within a physical network interface (e.g., physical ports (not shown) of the NICs 214/216). Accordingly, the Vports can allow the path management subsystems 210/212 and the hosts 206/208 to allocate and isolate network resources efficiently. For instance, the first NIC 214 can include a first Vport 218 that manages traffic corresponding to the first host 206 and a second Vport 220 that manages traffic corresponding to the second host 208. Likewise, the second NIC 216 can include a first Vport 222 that manages traffic corresponding to the second host 208 and a second Vport 224 that manages traffic corresponding to the first host 206.

In embodiments, the path management subsystems 210/212 can be communicatively linked via a control messaging interface 211. The control messaging interface 211 enables coordination between the hosts 206/208 and the NICs 214/216. For example, the control messaging interface 211 provides a dedicated management and control channel separate from a primary data communication path (e.g., in-band communication channels 215). The separate management and control channel ensures that control messages can be sent even if the primary data path is compromised or undergoing maintenance (such as during a host/NIC replacement). Specifically, the control messaging interface 211 can prioritize fault notifications. For example, the control messaging interface 211 can employ a communication protocol with a priority tagging system. The priority tagging system can ensure that fault detection and recovery messages are processed ahead of regular traffic. This prioritization is crucial in scenarios where rapid response times are essential to maintaining system stability and preventing data loss. The messaging protocol can also include robust error-checking and acknowledgment mechanisms, which guarantee the reliable delivery of messages even under adverse conditions, such as high network traffic or partial system failures.

The proprietary messaging protocol is further enhanced with a handshake mechanism confirming each message's receipt and understanding. This two-way communication ensures that when a fault is detected, not only is the message sent out to the affected endpoints but also that each endpoint confirms back that it has received the message and is taking the appropriate actions. This feedback loop is vital for the system's ability to coordinate a synchronized response to faults, allowing for a more organized and efficient recovery process.

Figure 3:
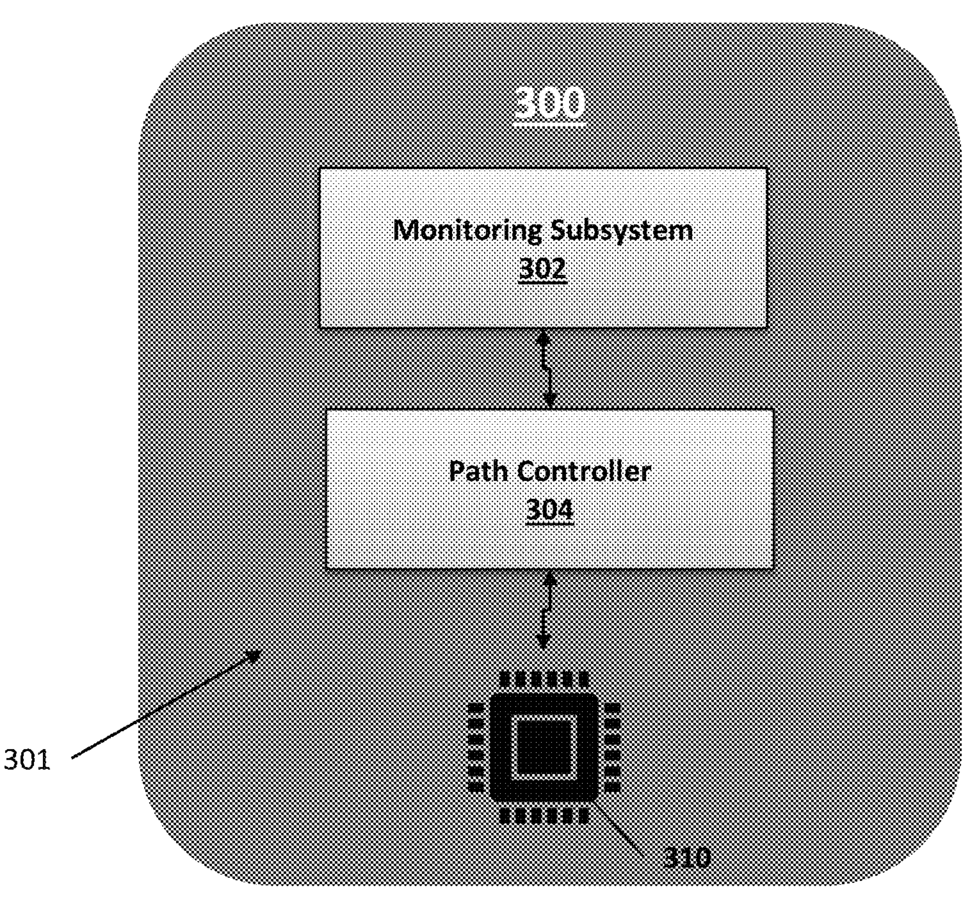
FIG. 3 is a block diagram of a path management subsystem in accordance with embodiments of the present disclosure.

Regarding FIG. 3, a path management subsystem 300 can be substantially similar to the path management subsystems 210/212 of FIG. 2. Accordingly, the path management subsystem 300 can include hardware, circuitry, or logical components 301 configured to manage communications paths corresponding to hosts (e.g., the hosts 206/208 of FIG. 2).

In embodiments, the path management subsystem 300 can include a monitoring subsystem (e.g., a fabric monitoring subsystem) 302 that continuously monitors the health and status of paths corresponding to hosts (e.g., the hosts 206/208 of FIG. 2). For instance, the monitoring subsystem 302 can monitor traffic corresponding to the hosts and corresponding primary/secondary NICs (e.g., the NICs 214/216) over in-band communication channels (e.g., channels 215 of FIG. 2) over a network (e.g., the SAN 118 of FIG. 1). In addition, the monitoring subsystem 302 can determine and measure metrics corresponding to the bandwidth, latency, and critical nature of data being transmitted over network data paths. Further, the monitoring subsystem 302 can maintain a data structure corresponding to the metrics in a local memory 310. The monitoring subsystem 302 can continuously scan PCIe links (e.g., the links 207*a*-*b*/209*a*-*b* of FIG. 2) and NICs (e.g., the NICs 214/216 of FIG. 2). For instance, the monitoring subsystem 302 can include logic and circuitry that detect anomalies signaling the onset of a fault condition.

The monitoring subsystem 302 can differentiate between fault types, such as unexpected NIC resets, PCIe link faults, or server power cycle events. For example, the monitoring subsystem can monitor for hardware interrupts specific to certain fault conditions. Specifically, a PCIe link fault can generate a different interrupt signal than one for a NIC reset or server power cycle.

In embodiments, the monitoring subsystem 302 can use signature analysis techniques to compare observed network behaviors against known fault signatures, e.g., stored in local memory 310. For example, each fault type (e.g., NIC reset, PCIe link fault, server power cycle) can have a corresponding unique signature based on the symptoms presented by a fault. Further, the monitoring subsystem 302 can use one or more machine learning techniques to detect network performance anomalies (i.e., performance that deviates from a baseline) that can indicate a fault.

Upon detecting a fault, the monitoring subsystem 302 can generate a hardware interrupt, which is relayed to the affected host's corresponding path management subsystem. For example, the hardware interrupt can be a non-maskable (NMI) signaling non-recoverable hardware error like a Message Signaled Interrupts Extended (MSI-X) interrupt. Accordingly, the monitoring subsystem 302 can communicate directly with a processor (e.g., central processing unit (CPU)) corresponding to the affected host, e.g., via in-band communication channels. Furthermore, the monitoring subsystem 302 can generate a distinct interrupt based on the type of fault condition. For example, the monitoring subsystem 302 can generate a secondary PCIe link-down hardware interrupt as a trigger to differentiate a NIC reset from a PCIe link fault.

In embodiments, the monitoring subsystem 302 can transmit a notification corresponding to an interrupt to the affected host's corresponding path management subsystem via an out-of-band communication channel defined by a control messaging interface (e.g., the interface 211 of FIG. 2). The notification can include a predefined message format for fault notifications, including fields for fault type, affected device identifiers, and recommended recovery actions. Further, the control message interface can use a messaging protocol with a priority tagging system that elevates handling fault notification messages above other types of traffic (e.g., regular IO data traffic).

Further, the monitoring subsystem 302 can use the control messaging interface and in-band communication channels (e.g., the channels 215 of FIG. 2) over, e.g., the SAN 118 of FIG. 1 to broadcast fault notifications to endpoints on the multi-host environment (e.g., the environment 142 of FIG.

1) and the SAN (e.g., the storage array 102 of FIG. 1). In embodiments, a broadcasted fault notification can correspond to a control message with instructions for the endpoints to initiate a traffic cleanup process. The traffic cleanup process can include disabling paths corresponding to the fault condition.

In embodiments, the path management subsystem 300 can include a path controller 304 configured to control and manage traffic corresponding to a host. For example, the path controller 304 can retrieve, from the monitoring subsystem 302, bandwidth and latency metrics corresponding to one or more paths or in-band communication channels (e.g., the channels 215 of FIG. 2) over, e.g., the SAN 118 of FIG. 1. The path controller 304 can use the metrics to prioritize specific paths over others to ensure that the most critical data continues to flow smoothly. For example, the path controller 304 can select an optimal traffic routing path that minimizes latency and maximizes throughput based on the metrics. Accordingly, the path controller 304 can dynamically adjust traffic routing based on real-time PCIe link state information received from the monitoring subsystem 302.

In response to receiving a fault notification, the path controller 304 can rapidly clean up in-flight traffic through a NIC or PCIe link corresponding to the source of the fault notification. For example, the path controller 304 can identify all input/output (IO) operations associated with the source of the fault notification. Accordingly, the path controller 304 can issue abort signals to terminate the identified IOs to prevent data loss and system disruption. If the fault notification corresponds to a NIC reset, the path controller 304 can disable all paths (e.g., PCIe links) through the faulted NIC. If the fault notification corresponds to a PCIe link, the path controller 304 can disable the paths associated with just the PCIe link. Further, the path controller 304 can reroute traffic away from a host/NIC in response to the monitoring subsystem 302 receiving an alert regarding the fault condition. For example, the path controller 304 can establish or identify alternative paths that can handle traffic over the network temporarily.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 4, a method 400 relates to achieving resiliency and high availability in a multi-host environment (e.g., the environment 200 of FIG. 2). In embodiments, a path management subsystem (e.g., subsystem 300 of FIG. 3) can perform all or a subset of operations corresponding to the method 400.

For example, the method 400, at 402, can include monitoring a plurality of Peripheral Component Interconnect Express (PCIe) links and network interface cards (NICs) controlled by a plurality of hosts in a multi-host environment. Additionally, at 404, the method 400 can include detecting a fault condition. For example, the fault condition can include at least an unexpected NIC reset, a PCIe link fault, or a server power cycle event. Further, the method 400, at 406, can include controlling traffic transmission over a network based on the fault condition type.

Further, each operation can include any combination of techniques implemented by the embodiments described herein. Additionally, one or more of the components 301 of the path management subsystem 300 can implement one or more of the operations of each method described above.

Figure 5:
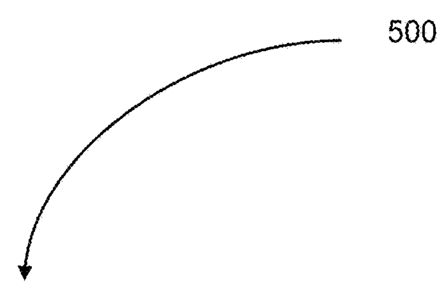
FIG. 5 is a flow diagram of a method for rapid fault identification and isolation in a multi-host environment per embodiments of the present disclosure.

Regarding FIG. 5, a method 500 relates to rapid fault identification and isolation in a multi-host environment (e.g., the environment 200 of FIG. 2). In embodiments, a path management subsystem (e.g., the subsystem 300 of FIG. 3) can perform all or a subset of operations corresponding to the method 500 via an out-of-band control messaging interface/channel (e.g., messaging interface/channel 211 of FIG. 2).

The method 500, at 502, can include broadcasting a message regarding a fault condition in a first server of a multi-host environment to network devices (e.g., other hosts 106 or the storage array 102 of FIG. 1). At 504, the method 500 can include initiating a traffic cleanup process in response to the broadcasted message. Further, the method 500, at 506, can include identifying a type of the fault condition. In addition, at 508, the method 500 can include adjusting data traffic routing to isolate the fault and maintain system service.

Further, each operation can include any combination of techniques implemented by the embodiments described herein. Additionally, one or more of the components 301 of the path management subsystem 300 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

monitoring, by a fabric monitoring subsystem, a plurality of Peripheral Component Interconnect Express (PCIe) links and network interface cards (NICs) controlled by a plurality of hosts in a multi-host environment;

detecting, by the fabric monitoring subsystem, a fault condition, wherein the fault condition includes at least an unexpected NIC reset, a PCIe link fault, or a server power cycle event, wherein detecting the fault condition comprises differentiating between the unexpected NIC reset, the PCIe link fault, and the server power cycle event using signature analysis techniques that compare observed network behaviors against known fault signatures stored in memory; and controlling traffic transmission over a network based on the fault condition, wherein controlling traffic transmission comprises selecting an optimal traffic routing path that minimizes latency and maximizes throughput based on bandwidth, latency, and error rate criteria.

2. The method of claim 1, further comprising:

transmitting a fault notification to a subject host of the plurality of hosts affected by the fault condition.

3. The method of claim 2, further comprising:

initiating a traffic path failover process in response to the fault notification.

4. The method of claim 1, further comprising:

disabling data traffic paths corresponding to the fault condition.

5. The method of claim 1, further comprising:

continuing network operations over data traffic paths alternate to those data traffic paths corresponding to the fault condition.

6. The method of claim 1, further comprising:

notifying one or more endpoints on the network and in the multi-host environment of the fault condition.

7. The method of claim 6, further comprising:

using an out-of-band control messaging interface to notify and send control messages to a subject host of the plurality of hosts affected by the fault condition.

8. The method of claim 1, further comprising:

transmitting a hardware interrupt indicative of the fault condition to a subject host of the plurality of hosts affected by the fault condition, wherein the hardware interrupt is a non-maskable interrupt (NMI) signaling a non-recoverable hardware error, and wherein a distinct interrupt signal is generated based on the type of fault condition to differentiate the unexpected NIC reset from the PCIe link fault.

9. The method of claim 8, further comprising:

determining, by the subject host, whether the hardware interrupt signals a NIC reset or a PCIe link fault based on the distinct interrupt signal;

executing, by the subject host, a rapid cleanup of in-flight traffic through each PCIe link and each NIC corresponding to the fault condition, wherein executing the rapid cleanup comprises: identifying all input/output (IO) operations associated with a source of a fault notification corresponding to the fault condition; and issuing abort signals to terminate the identified IO operations to prevent data loss and system disruption;

disabling, by the subject host, data traffic paths through each PCIe link and each NIC corresponding to the fault condition, wherein if the fault notification corresponds to a NIC reset, all paths through a faulted NIC are disabled, and if the fault notification corresponds to a PCIe link fault, only paths associated with the PCIe link fault are disabled.

10. The method of claim 9, further comprising:

maintaining, by the subject host, network operations through an operational NIC or PCIe link.

11. An apparatus with a memory and processor, the apparatus configured to:

monitor, by a fabric monitoring subsystem, a plurality of Peripheral Component Interconnect Express (PCIe) links and network interface cards (NICs) controlled by a plurality of hosts in a multi-host environment;

detect, by the fabric monitoring subsystem, a fault condition, wherein the fault condition includes at least an unexpected NIC reset, a PCIe link fault, or a server power cycle event, wherein detecting the fault condition comprises differentiating between the unexpected NIC reset, the PCIe link fault, and the server power cycle event using signature analysis techniques that compare observed network behaviors against known fault signatures stored in memory; and control traffic transmission over a network based on the fault condition, wherein controlling traffic transmission comprises selecting an optimal traffic routing path that minimizes latency and maximizes throughput based on bandwidth, latency, and error rate criteria.

12. The apparatus of claim 11, further configured to:

transmit a fault notification to a subject host of the plurality of hosts affected by the fault condition.

13. The apparatus of claim 12, further configured to:

initiate a traffic path failover process in response to the fault notification.

14. The apparatus of claim 11, further configured to:

disable data traffic paths corresponding to the fault condition.

15. The apparatus of claim 11, further configured to:

continue network operations over data traffic paths alternate to those data traffic paths corresponding to the fault condition.

16. The apparatus of claim 11, further configured to:

notify one or more endpoints on the network and in the multi-host environment of the fault condition.

17. The apparatus of claim 16, further configured to:

use an out-of-band control messaging interface to notify and send control messages to a subject host of the plurality of hosts affected by the fault condition.

18. The apparatus of claim 11, further configured to:

transmit a hardware interrupt indicative of the fault condition to a subject host of the plurality of hosts affected by the fault condition, wherein the hardware interrupt is a non-maskable interrupt (NMI) signaling a non-recoverable hardware error, and wherein a distinct interrupt signal is generated based on the type of fault condition to differentiate the unexpected NIC reset from the PCIe link fault.

19. The apparatus of claim 18, further configured to:

determine whether the hardware interrupt signals a NIC reset or a PCIe link fault based on the distinct interrupt signal;

execute a rapid cleanup of in-flight traffic through each PCIe link and each NIC corresponding to the fault condition, wherein executing the rapid cleanup comprises: identifying all input/output (IO) operations associated with a source of a fault notification corresponding to the fault condition; and issuing abort signals to terminate the identified IO operations to prevent data loss and system disruption;

disable data traffic paths through each PCIe link and each NIC corresponding to the fault condition, wherein if the fault notification corresponds to a NIC reset, all paths through a faulted NIC are disabled, and if the fault notification corresponds to a PCIe link fault, only paths associated with the PCIe link fault are disabled.

20. The apparatus of claim 19, further configured to:

maintain network operations through an operational NIC or PCIe link.

* * * * *